United States Patent [19]
Gilges et al.

[11] Patent Number: 5,370,011
[45] Date of Patent: Dec. 6, 1994

[54] POSITIONING ACTUATOR

[75] Inventors: Siegmar Gilges, Bad Schwalbach; Michael Georgi, Taunusstein; Arnold Ries, Beselich-Obertiefenbach; Rolf Slatter, Dornburg; Karl Hammes, Hundsangen, all of Germany

[73] Assignee: Harmonic Drive Antriebstechnik GmbH, Lahn, Germany

[21] Appl. No.: 932,598

[22] Filed: Aug. 20, 1992

[30] Foreign Application Priority Data

Aug. 20, 1991 [DE] Germany .................. 4127487

[51] Int. Cl.⁵ ......................................... F16H 27/02
[52] U.S. Cl. ......................... 74/89; 74/89.15; 74/640; 192/143
[58] Field of Search ............ 74/89.14, 89.15, 424.8 R, 74/459, 640, 89; 142/141, 143

[56] References Cited

U.S. PATENT DOCUMENTS

| | | | |
|---|---|---|---|
| 2,444,886 | 7/1948 | Vickers | 74/459 |
| 2,620,683 | 12/1952 | Geyer | 74/665 |
| 2,660,029 | 11/1953 | Geyer | 60/6 |
| 2,932,986 | 4/1960 | Musser | 74/665 |
| 2,943,513 | 7/1960 | Musser | 74/640 |
| 2,966,070 | 12/1960 | Wise | 74/424.8 |
| 3,077,792 | 2/1963 | Kinderman | 74/640 |
| 3,178,958 | 4/1965 | Beck | 74/424.8 |
| 3,449,971 | 6/1969 | Posh | 74/89.14 X |
| 3,548,227 | 4/1969 | Woodward | 310/83 |
| 4,557,153 | 12/1985 | Ulbing | 74/640 X |
| 5,150,872 | 9/1992 | Isomura | 74/89.14 X |

FOREIGN PATENT DOCUMENTS

| | | |
|---|---|---|
| 0232022 | 8/1987 | European Pat. Off. . |
| 3151647 | 9/1982 | Germany . |
| 3629279 | 3/1988 | Germany . |
| 8717755 | 3/1990 | Germany . |
| 84/02405 | 6/1984 | WIPO . |

OTHER PUBLICATIONS

Technische Rundschau, "Prazisionsgetriebe fur hohe Drehmomente", Peter Eisenring, Bd. 77, Nr. 19, Mai 1985, Bern Ch, Seiten 44–49.

*Primary Examiner*—David W. Laub
*Attorney, Agent, or Firm*—Longacre & White

[57] ABSTRACT

The present disclosure concerns an actuator for converting rotary movement into linear movement. The actuator comprises a prime mover turning a reduction gear assembly which, in turn, drives a mechanical transmission including a linearly moving control element. To achieve precise movement of the control element to a desired position, and to ensure the desired position is retained as exactly as possible, a reduction gear assembly which is self-locking with respect to the maximum back-driving torque exerted on the reduction gear assembly by the mechanical transmission, is combined with a low friction, non-self-locking mechanical transmission. Preferably, the reduction gear assembly is implemented in the form of a strain wave reduction gear set and the mechanical transmission element is implemented in the form of a cooperating ballscrew and ballnut.

10 Claims, 1 Drawing Sheet

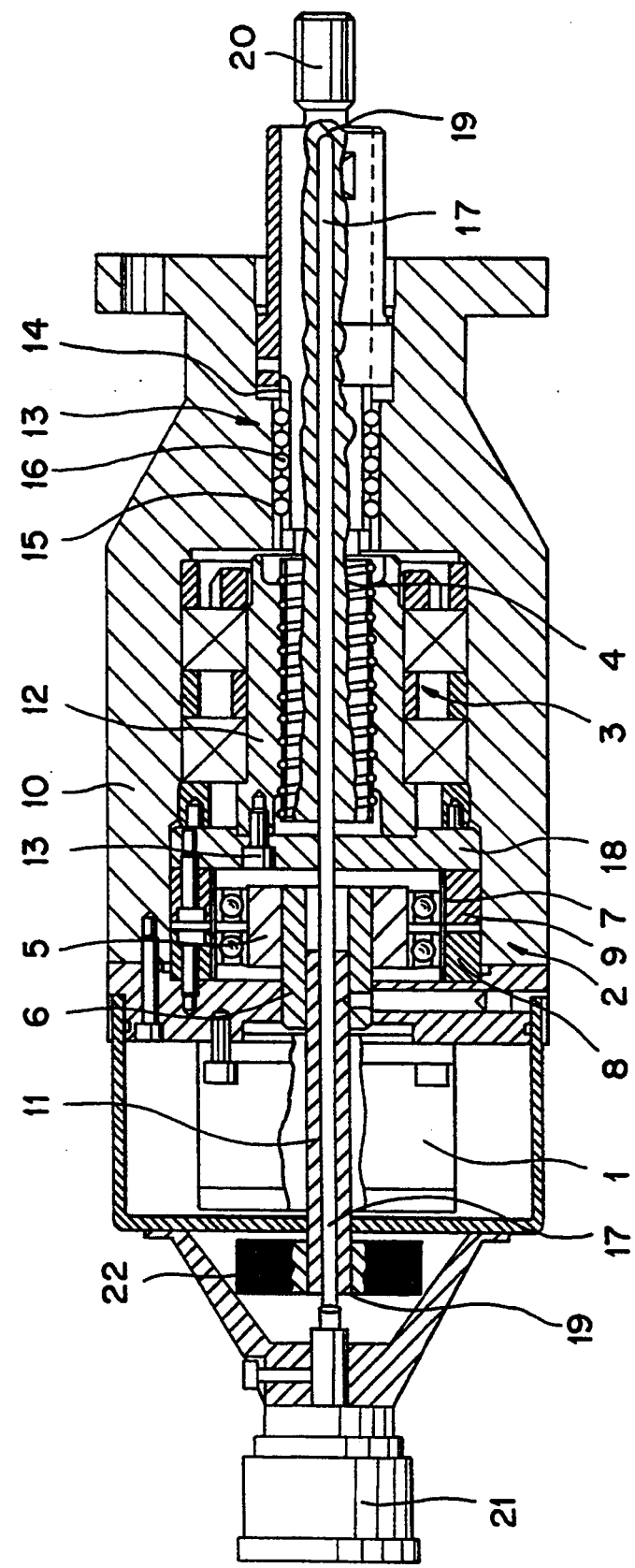

POSITIONING ACTUATOR

BACKGROUND OF THE INVENTION a) Field of the Invention

The invention concerns an actuator for converting rotary movement into linear movement. The actuator comprises a prime mover turning a strain wave reduction gear assembly which, in turn, drives a mechanical transmission including a linearly moving control element.

It is known to use actuators to compensate for the bending of heavy and/or pre-loaded structural members in the headbox or coating sections of paper-making machines. Further, it is also known to use actuators for adjusting the blades of plastic extrusion machines, as well as veneering machines.

b) Description of Related Art

European Patent EP-0 232 022 discloses an actuator for converting relatively low torque rotary movement into relatively high force linear movement. Specifically, a prime mover turns a first strain wave reduction gear assembly. In turn, the first strain wave reduction gear assembly turns a second strain wave reduction gear assembly which drives a spindle constrained to linear movement via acme threads cooperating with a peg and slot.

Further, actuators for converting low torque rotary movement into high force linear movement using electric motors driving either a worm gear or a planetary gear acting on a threaded spindle are known.

In these known actuators, linear positioning is regulated using closed loop feedback control. When the desired position has been reached, the actuator is switched "off" (i.e. the actuator is disconnected from a current supply) and the control loop is deactivated. However, it becomes necessary to provide self-locking elements in the reduction gear assembly to retain the desired position within one micron.

Disadvantages of the known actuators include unsatisfactory positioning accuracy and poor resolution. A combination of hysteresis effects due to friction, mechanical play, wind-up and stick/slip result in poor movement characteristics, which in turn prevent micron-range positioning precision. Additionally, the known actuators suffer from excessive wear of gear elements such as worm gears and acme threaded spindles. Further, many of the known actuators are preloaded to remove mechanical backlash, which also leads to increased wear of the gear elements. It has also been found that the power consumption and heat generated by the known actuators is excessive in some application.

Another significant disadvantage of the known actuators is the wide variation in the degree of hysteresis loss as a function of the control element's position with respect to the actuator. Accordingly, it is not possible to relate the linear movement force to the power consumption of the prime mover for the purpose of regulating the force based upon power consumption. Instead, overload protection devices such as the mechanical overload clutch disclosed in EP-0 232 022 are used to protect the gear elements and the control loop components.

SUMMARY OF THE INVENTION

An objective of the present invention is to provide a positioning device having compact dimensions and high axial stiffness, while minimizing hysteresis effects. At the same time, the present invention provides an accurate positioning device and ensures the desired position is retained as exactly as possible.

To achieve these objectives, the present invention comprises a reduction gear assembly which is self-locking against back-driving, and a transmission element which is not self-locking.

According to the present invention, the apparently contradictory requirements for minimal hysteresis losses and mechanical self-locking are satisfied using a non self-locking, backlash-free mechanical transmission which minimizes hysteresis losses and overall friction, and a self-locking strain wave reduction gear assembly which ensures retention of the achieved position. Further, the present invention features a lower number of components than known actuators, as well as increased operating safety. The use of a coaxial reduction gear assembly between the prime mover and the mechanical transmission also provides the complete actuator with a high degree of axial stiffness.

A variety of reduction gear assemblies are known, including planetary or cycloidal gear sets, which could be considered to be coaxial reduction gear assemblies. However, a preferred embodiment of the present invention uses a strain wave gear set for the coaxial reduction gear assembly. Strain wave gear sets, such as that described in World Patent WO-8 402 405, provide backlash-free, high reduction ratios with low hysteresis losses during torque transmission. In the present invention, using a strain wave gear set improves the movement characteristics of the actuator. In addition, strain wave gear sets have a much more compact design than other gear sets, which is particularly advantageous for applications in paper-making machines. Strain wave gear sets further provide minimal wear without an increase in backlash, and have an operating life far in excess of known actuators.

In a further embodiment of the present invention, the mechanical transmission comprises a ballscrew cooperatively engaged with a ballnut. This provides an essentially backlash-free, low friction mechanical transmission with high transmission accuracy and axial stiffness, as well as low hysteresis losses.

Alternatively, planetary or recirculating roller type mechanical transmissions could be used to convert rotary movement to linear movement.

In yet a further embodiment of the present invention, the self-locking characteristic of the reduction gear assembly is achieved by selecting the strain wave gear set on the basis of the maximum back-driving torque the mechanical transmission will exert on the reduction gear assembly, not according to the input torque of the prime mover. Consequently, it is possible to retain the actuator within one micron of the desired position, even if the prime mover is turned off or fails, because the reaction force opposing linear movement of the mechanical transmission is insufficient to back-drive the reduction gear assembly. That is to say, the torque exerted on the reduction gear assembly by the mechanical transmission, under the maximum tensile or compressive loading of the linearly moving control element, is less than the back-driving starting torque of the reduction gear assembly. Preferably, the reduction gear assembly is loaded at less than 80%, and normally 20 to 30%, of rated output torque when the maximum back-driving torque is exerted.

The resistance of the reduction gear assembly to back-driving torque by may be enhanced by including a viscous fluid or other friction increasing measures acting on the input side of the reduction gear assembly to increase the back-driving starting torque.

According to the present invention, it is also possible to regulate the force exerted by the linearly moving control element simply by adjusting the power supplied to the prime mover. This feature is a result of the excellent transmission characteristics, low hysteresis losses and little hysteresis variation over the whole stroke of the control element. Consequently, the complex mechanical overload clutches, with their inherent mechanical backlash, used in many known actuators are rendered unnecessary. The present invention is also easier to use than the known actuators since the linear movement force can be adjusted electrically. In particular, it is very easy to adjust the power consumption of an electric prime mover so as to regulate the force exerted by the linearly moving control element.

Yet another embodiment according to the present invention does not use a self-locking reduction gear assembly. In this embodiment, the back-driving torque exerted on the reduction gear assembly by the mechanical transmission is counteracted by the controlled stall torque of the prime mover. In the case of an electric motor, the stall torque can be controlled by adjusting the current supplied to the motor. A closed control loop, in which a system for measuring the position of the control element is integrated, determines the current necessary to retain the position of the control element based on the tensile or compressive force acting on the control element. In place of an electric motor, it is also possible to use pneumatic or hydraulic prime movers with appropriate control loops to ensure locking of the actuator when the desired position of the control element is achieved.

In yet a further embodiment of the present invention, the mechanical transmission comprises a low-friction, backlash-free transmission, preferably a ballscrew and ballnut. Here again, complex overload protection devices to prevent damage to the reduction gear assembly and associated components are unnecessary.

In certain applications, a mechanical or electro-mechanical brake may be applied to the input shaft of the reduction gear for safety reasons.

In yet a further embodiment of the present invention, linear guidance for the control element may be provided by antifriction elements rolling in cooperating axial grooves formed on the control element and in the housing. Apart from minimizing friction losses and wear, the linear guidance also provides a backlash-free method for preventing the control element from rotating with respect to the housing.

A particularly compact, axially stiff design is achieved according to the present invention by coaxially arranging the axes of rotation for the reduction gear assembly and the mechanical transmission.

Yet another further embodiment of the present invention includes a probe for measuring the position of the control element. The probe extends in a feedthrough formed along the axis of rotation for the coaxial prime mover, reduction gear assembly and mechanical transmission. Because the probe is inserted in a feedthrough running through the actuator, errors associated with off-axis measurement may be avoided. At the same time, the probe is protected against damage or aggressive environmental influences. The feedthrough for the probe is created by forming the prime mover, the reduction gear assembly, as well as the control element, with hollow shafts.

Further objectives, advantages, features and possible applications for the present invention will become apparent from the following descriptions of the exemplary embodiment shown in the appended drawing figure.

BRIEF DESCRIPTION OF THE DRAWING

The sole FIGURE shows a partial cross-section of an actuator according to the present invention.

DESCRIPTION OF THE PREFERRED EMBODIMENT

The FIGURE shows an actuator according to the present invention comprising a prime mover 1, which turns a strain wave reduction gear assembly 2. The strain wave reduction gear assembly 2 drives a mechanical transmission 3 having a linearly movable, non-rotatable control element 4. An adapter 20 is located at the free end of the control element 4 to facilitate connection of the actuator to a member being acted upon.

In the embodiment shown, an electric motor is implemented as the prime mover 1, however, alternatives including pneumatic and hydraulic motors are also contemplated. The motor shaft 11 is connected to the input shaft 6 of the strain wave reduction gear assembly 2. On the input side, the strain wave reduction gear assembly 2 comprises a wave generator 5, which has an elliptical shape and transmits wave-formed displacements to an externally toothed steel ring 7, when the input shaft 6 is rotated. The externally toothed steel ring 7, which is continuously deformed during operation, is in rolling contact with the internal teeth of two ring gears 8,9. The static ring gear 8 is positioned at the input side of the strain wave reduction gear assembly 2, has a slightly larger number of teeth than the external toothed steel ring 7, and is rotationally fixed to the housing 10. The dynamic ring gear 9 is positioned at the output side of the strain wave reduction gear assembly 2 and has the same number of teeth as the externally toothed steel ring 7. The small difference in the number of teeth on the externally toothed steel ring 7 and the static ring gear 8 leads to a high reduction ratio when the input shaft 6 is rotated.

As can also be seen from the embodiment shown in the FIGURE, the mechanical transmission 3 is implemented as a ballscrew and ballnut. The ballscrew is formed on the surface of the control element 4, while the ballnut 12 is operatively connected to the dynamic ring gear 9 via a connection 13 and an output flange 18. Thus, rotary movement of relatively low torque prime mover 1 is converted, via the strain wave reduction gear assembly 2 and mechanical transmission 3, into relatively high tensile or compressive force linear movement of the control element 4.

The strain wave reduction gear assembly 2 is sized so that the actuator is self-locking when the prime mover is turned "off" or fails. In particular, the starting torque necessary to back-drive the strain wave reduction gear assembly 2 exceeds the maximum torque exerted on the strain wave reduction gear assembly 2 by the mechanical transmission 3. Consequently, the strain wave reduction gear assembly 2 is self-locking with respect to output-side torque loading, and the actuator cannot be back-driven by the axial load acting on the control element 4. This ensures that when the desired position has been achieved by the control element 4 and the prime mover 1 is switched off, the position of the control element 4 can be retained within a tolerance of one micron. The strain wave reduction gear assembly 2 will act in a self-locking manner when the maximum output-side torque load is less than 80% of the rated output torque of the strain wave reduction gear assembly 2.

The selection of a self-locking strain wave reduction gear assembly 2 in combination with a non-self-locking mechanical transmission 3, minimizes hysteresis effects to enable precise positioning by the actuator according to the present invention.

To prevent rotation of the control element 4, a backlash-free linear guidance system comprises axial grooves 14 formed on the surface of the control element 4, cooperating axial grooves 15 formed in the housing 10, and rolling or ball elements 16 received by the axial grooves 14,15.

Due to the excellent operating characteristics of the present invention (i.e. low hysteresis losses and little hysteresis variation), it is also possible to regulate the axial force exerted by the control element 4 simple by adjusting the power consumption of the prime mover 1.

As can also be seen from the Figure, the motor shaft 11 of prime mover 1, the strain wave reduction gear assembly 2, and the mechanical transmission 3 are arranged along a common lengthwise axis. All the aforementioned components being formed around hollow shafts to provide a lengthwise feedthrough 19 for a probe 17 of a position measurement system. The position measurement system measures the position of the control element 4 and can be provided with an electrical transducer, for example, an inductive absolute position sensor (not shown). The output signal from the transducer can be passed to a control system to adjust the position of the control element 4. The position measurement system shown in this embodiment also features a mechanical indicator in the form of a dial gauge 21, which serves as a check for electrically measured position information. The actuator is also provided with a redundant operating system to enable manual adjustment of the control element 4. Hand wheel 22 can also be used to synchronize the electrical and mechanical measurement systems.

What is claimed is:

1. An actuator converting rotational movement into precise linear movement, wherein rotational movement torque is relatively small with respect to linear movement force, said actuator comprising:
   a prime mover;
   a self-locking strain wave reduction gear assembly including an elliptical wave generator turned by said prime mover; and
   a non-self-locking mechanical transmission including a control element adapted for linear movement, said strain wave reduction gear assembly driving said mechanical transmission;
   wherein said strain wave reduction gear assembly is self-locking with respect to back-driving torque exerted on said strain wave reduction gear assembly by said mechanical transmission.

2. The actuator according to claim 1 wherein said mechanical transmission comprises a ballscrew, a ballnut and first rolling means for cooperatively engaging said ballscrew and said ballnut.

3. The actuator according to claim 1 further comprising control loop means for regulating said force by adjusting power consumption of said prime mover.

4. The actuator according to claim 1 wherein said prime mover electro-mechanically brakes an input shaft to said strain wave reduction gear assembly.

5. The actuator according to claim 1 further comprising:
   a substantially backlash-free linear guidance means for restricting rotary movement of said control element with respect to a relatively stationary housing, said linear guidance means including first axial grooves on said control element, second axial grooves in said housing, and second rolling means for cooperatively engaging said first axial grooves and said second axial grooves.

6. The device actuator to claim 1 further comprising:
   a feedthrough extending along coaxial axes of rotation for said prime mover, said strain wave reduction gear assembly and said mechanical transmission; and
   probe means for determining the position of said control element with respect to a relatively stationary housing;
   wherein said probe means extends through said feedthrough.

7. The actuator according to claim 1 wherein torque necessary to back-drive said strain wave reduction gear assembly exceeds said back-driving torque produced by said mechanical transmission.

8. The actuator according to claim 7 wherein said torque necessary to back-drive said strain wave reduction gear assembly is less than 80% of said back-driving torque produced by said mechanical transmission.

9. The actuator according to claim 8 wherein said torque necessary to back-drive said strain wave reduction gear assembly is less than 30% of said back-driving torque produced by said mechanical transmission.

10. An actuator converting rotational movement into precise linear movement, wherein rotational movement torque is relatively small with respect to linear movement force, said actuator comprising:
    a prime mover;
    a self-locking strain wave reduction gear assembly including an elliptical wave generator turned by said prime mover; and
    a non-self-locking mechanical transmission including a control element adapted for linear movement, said strain wave reduction gear assembly driving said mechanical transmission;
    wherein a stall torque of said prime mover driving said strain wave reduction gear assembly exceeds a back-driving torque exerted on said strain wave reduction gear assembly by said mechanical transmission.

* * * * *